US009109447B2

(12) United States Patent
McMahan et al.

(10) Patent No.: US 9,109,447 B2
(45) Date of Patent: Aug. 18, 2015

(54) COMBUSTION SYSTEM INCLUDING A TRANSITION PIECE AND METHOD OF FORMING USING A CAST SUPERALLOY

(75) Inventors: Kevin Weston McMahan, Greer, SC (US); Arthur Peck, Greenville, SC (US); Nicholas Vlessis, Portland, OR (US)

(73) Assignee: General Electric Company, Schenectady, NY (US)

( * ) Notice: Subject to any disclaimer, the term of this patent is extended or adjusted under 35 U.S.C. 154(b) by 714 days.

(21) Appl. No.: 13/454,785

(22) Filed: Apr. 24, 2012

(65) Prior Publication Data
US 2013/0276451 A1 Oct. 24, 2013

(51) Int. Cl.
*F23R 3/44* (2006.01)
*F01D 9/02* (2006.01)
*B22D 19/00* (2006.01)

(52) U.S. Cl.
CPC ............ *F01D 9/023* (2013.01); *B22D 19/0009* (2013.01); *B23P 2700/13* (2013.01); *F05D 2230/21* (2013.01); *F05D 2230/211* (2013.01); *Y10T 29/49988* (2015.01)

(58) Field of Classification Search
CPC .... F01D 9/023; B22D 19/00; B22D 19/0009; B23P 2700/13; F05D 2230/21; F05D 2230/211
USPC ................................... 60/752, 755–760, 796
See application file for complete search history.

(56) References Cited

U.S. PATENT DOCUMENTS

| 3,527,285 A | 9/1970 | Webbere |
| 4,236,378 A | 12/1980 | Vogt |
| 4,422,288 A * | 12/1983 | Steber ............................. 60/800 |
| 5,335,502 A | 8/1994 | Roberts, Jr. et al. |
| 5,414,999 A | 5/1995 | Barnes |
| 5,964,091 A * | 10/1999 | Fukui et al. ...................... 60/752 |
| 6,416,596 B1 | 7/2002 | Wood et al. |
| 6,428,637 B1 | 8/2002 | Wood et al. |
| 6,553,767 B2 | 4/2003 | Farmer et al. |
| 6,851,263 B2 * | 2/2005 | Stumpf et al. .................. 60/750 |
| 6,890,148 B2 * | 5/2005 | Nordlund ..................... 415/115 |

(Continued)

FOREIGN PATENT DOCUMENTS

| EP | 2206886 A2 | 7/2010 |
| WO | 9906771 | 2/1999 |

OTHER PUBLICATIONS

Mondal, Biswanath ed., et al., "Investment Casting", Allied Publishers Pvt. Ltd, Mumbai, India, 2004, pp. 91-92.*

*Primary Examiner* — William H Rodriguez
*Assistant Examiner* — Lorne Meade
(74) *Attorney, Agent, or Firm* — McNees Wallace & Nurick LLC (57) ABSTRACT

A combustion system including a transition piece and method of forming the transition piece using a cast nickel-based superalloy is provided. The transition piece includes a body defining a flowpath and enclosure, the body having a circular inlet section for receiving combustion product from the combustor and an outlet end for flowing the combustor products into a first stage nozzle of a gas turbine. The transition piece comprises a one-piece single casting construction of the circular inlet section, the body, and the outlet end. The transition piece is formed from a nickel-based superalloy. The transition piece has a thick-to-thin ratio of wall thickness of thick transition to wall thickness of thin transition of about 1.1 to about 2.5.

15 Claims, 6 Drawing Sheets

(56) References Cited

U.S. PATENT DOCUMENTS

| | | |
|---|---|---|
| 7,082,766 B1 | 8/2006 | Widener et al. |
| 7,373,772 B2 | 5/2008 | Simons et al. |
| 7,377,117 B2 * | 5/2008 | Riggi et al. .................... 60/796 |
| 7,540,156 B2 | 6/2009 | Brown et al. |
| 7,631,504 B2 * | 12/2009 | Belsom ......................... 60/772 |
| 8,397,511 B2 * | 3/2013 | Chen et al. ..................... 60/752 |
| 2004/0079083 A1 | 4/2004 | Stumpf et al. |
| 2007/0033941 A1 | 2/2007 | Riggi, Jr. et al. |
| 2010/0293957 A1 * | 11/2010 | Chen et al. ..................... 60/752 |
| 2011/0052443 A1 * | 3/2011 | Hanlon et al. ................ 420/448 |

\* cited by examiner

COMBUSTION SYSTEM INCLUDING A TRANSITION PIECE AND METHOD OF FORMING USING A CAST SUPERALLOY

FIELD OF THE INVENTION

The present invention relates generally to gas turbines, and more specifically to materials for hot gas path parts, such as, but not limited to, a transition piece within the combustion chamber of the gas turbine.

BACKGROUND

The combustion system of a gas turbine generates hot gases. The hot gases can be utilized to drive a turbine. The turbine, in turn, can drive a compressor, wherein the compressor provides compressed air for combustion in the combustion system. Additionally, the turbine produces usable output power, which can be connected directly to power-consuming machinery or to a generator.

The combustion system for a gas turbine may be configured as a circular array of combustion chambers. The combustion chambers are arranged to receive compressed air from the compressor, inject fuel into the compressed air to create a combustion reaction, and generate hot combustion gases thr the turbine. The combustion chambers are generally cylindrically shaped; however, other shapes of combustion chambers are possible. Each combustion chamber comprises one or more fuel nozzles, a combustion zone within the combustion liner, a flow sleeve surrounding and radially spaced from the liner, and a gas transition duct, or transition piece, between the combustion chamber and turbine.

Large gas turbine combustor components have traditionally been fabricated with superalloys, such as, but not limited to, wrought nickel-based superalloys. As turbine designs evolved for operation at higher temperatures, superior low cycle fatigue, oxidation and creep properties of cast superalloys were desired. Also, multiple cast pieces subsequently were joined to turbine combustor components by metallurgical connecting means, such as but not limited to, brazing or welding. However, these means, such as, but not limited to, brazing or welding have not been desirable since the joint locations did not have material properties that match the remainder of the turbine combustor components. Accordingly, a need for turbine combustor components with connected cast pieces is desired where the connected cast pieces have similar material properties as the turbine combustor components as well as the means for connecting the connected cast pieces to the turbine combustor components.

Transition pieces for gas turbine combustors have been formed from various materials, for example, some transition pieces have been formed with a nickel/cobalt based cast alloy, such as GTD-222® (GTD-222 is a registered trademark of General Electric Company, Schenectady, N.Y.). These materials have provided improvement in material properties, such as, but not limited to, at least one of low cycle fatigue (LCF) resistance and creep strength vs. wrought alloys, manufacturability, machinability, weldability, and oxidation resistance, in turbine combustor components including hot gas path parts. These improvements are especially evident with respect to wrought alloy material properties. However, for some high temperature turbine applications, increased material characteristics, such as strength, would provide desirable life potentials of hot gas path parts.

Prior attempts to produce large cast objects with thin walls have not been overly successful. In prior casting attempts problems arose for example, but limited to, when the molten material cools too quickly in the mold due to thinner formed walls, thus resulting in a product that may not have desirable properties for a hot gas path part.

Therefore, a combustion system including a transition piece and method of forming the transition piece that do not suffer from the above drawbacks is desirable in the art.

SUMMARY OF THE INVENTION

According to an exemplary embodiment of the present disclosure, a transition piece for a gas turbine is provided. The transition piece includes a body defining a flowpath and enclosure, the body having a rounded inlet section for receiving combustion products from a combustor and an outlet end for flowing the combustor products into a first stage nozzle of the gas turbine. The transition piece includes a one-piece cast construction of the rounded inlet section, the body and the outlet end, the transition piece being formed from a nickel-based superalloy. The transition piece has a thick-to-thin transition ratio of wall thickness of thick transition to wall thickness of thin transition of about 1.1 to about 2.5.

According to another exemplary embodiment of the present disclosure a method of forming a one-piece cast transition piece is provided. The method includes providing a transition piece pattern. The method includes dipping the transition piece pattern in a slurry material to build up the slurry material. The method includes firing the slurry material to produce a transition piece shell. The method includes introducing a molten material including molten metal to the transition piece shell. The method includes solidifying the molten material to form the one-piece cast transition piece, wherein the one-piece cast transition piece is formed from the molten material.

According to another exemplary embodiment of the present disclosure, a combustion system is provided. The combustion system includes a combustor and a transition piece. The transition piece includes a body defining a flowpath and enclosure, the body having a circular inlet section for receiving combustion products from the combustor and an outlet end for flowing the combustor products into a first stage nozzle of a gas turbine. The transition piece includes a one-piece casting construction, the transition piece being formed from a nickel-based superalloy. The transition piece has a thick-to-thin transition ratio of wall thickness of thick transition to wall thickness of thin transition of about 1.1 to about 2.5.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided is a combustion system and transition piece that do not suffer from the drawbacks of the prior art. Embodiments of the present disclosure include a gas turbine transition piece that will extend, combustion inspection intervals.

Another advantage of an embodiment of the present disclosure is a single-piece/unitary transition piece can be cast with desirable and enhanced mechanical properties.

Yet another advantage of an embodiment of the present disclosure is the one-piece cast transition piece that can provides longer component life in the gas turbine combustion system.

Another advantage of an embodiment of the present disclosure is that cost and time to produce the transition piece is reduced because less finishing machining is required and other post-casting processes are eliminated.

Yet another advantage of an embodiment of the present disclosure is the one-piece transition piece construction provides enhanced strength to extend turbine life.

Another advantage of an embodiment of the present disclosure is the one-piece cast transition piece with integral casting improves integrity of the transition piece by eliminating weaker joints evident in prior welding of transition piece components or features.

Figure 1:
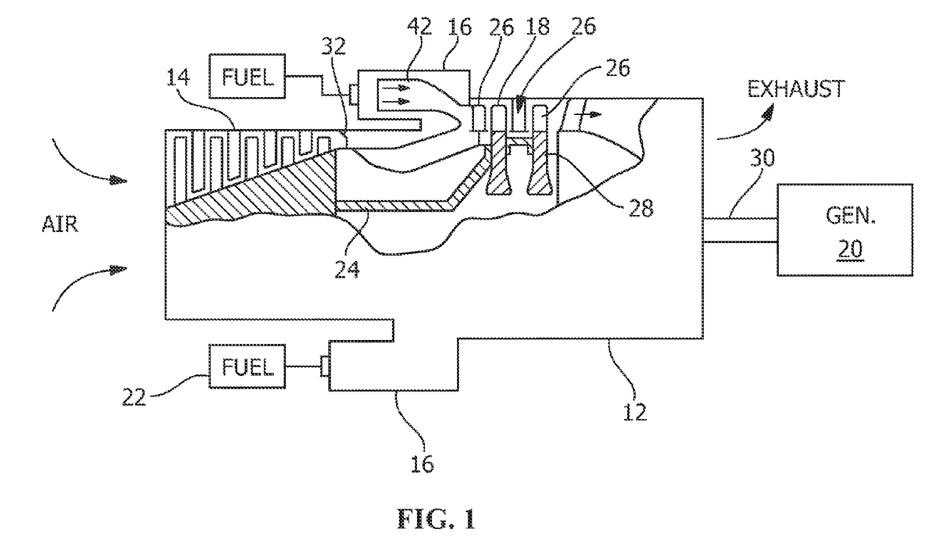
FIG. 1 illustrates a turbine comprising a combustion system, with a section of the turbine being cut-away to illustrate internal components of the gas turbine.

The gas turbine engine 12, depicted in FIG. 1, includes a compressor 14, combustion system 16, and a gas turbine 18. The compressor 14, combustion system 16, and gas turbine 18 are disposed around at least one of rotatable shaft 24. Atmospheric air enters the gas turbine engine 12 to be pressurized, heated and expelled to provide usable power output 30. Power output 30 can be provided to a power-driven machine or an associated power-generating machine, such as, but not limited to, an electric generator 20.

The compressor 14 provides pressurized air to the combustion system 16. Fuel is provided to the combustion system 16 from a fuel system 22. The fuel can be mixed with pressurized air in a combustion chamber 40 to generate combustion gases and heat energy. The combustion gases flow away from combustion chamber 40 to gas turbine 18. The combustion gases flow through an annular array(s) of turbine blades 26, which are mounted on disks 28. These disks 28 rotate with a respective shaft 24. The rotation of each shaft 24 turns compressor 14, which in turn compresses the air to feed the combustion process. Also, rotation of shaft 24 can also provide a power output 30 from gas turbine 18 to generator 20 or other system.

Figure 2:
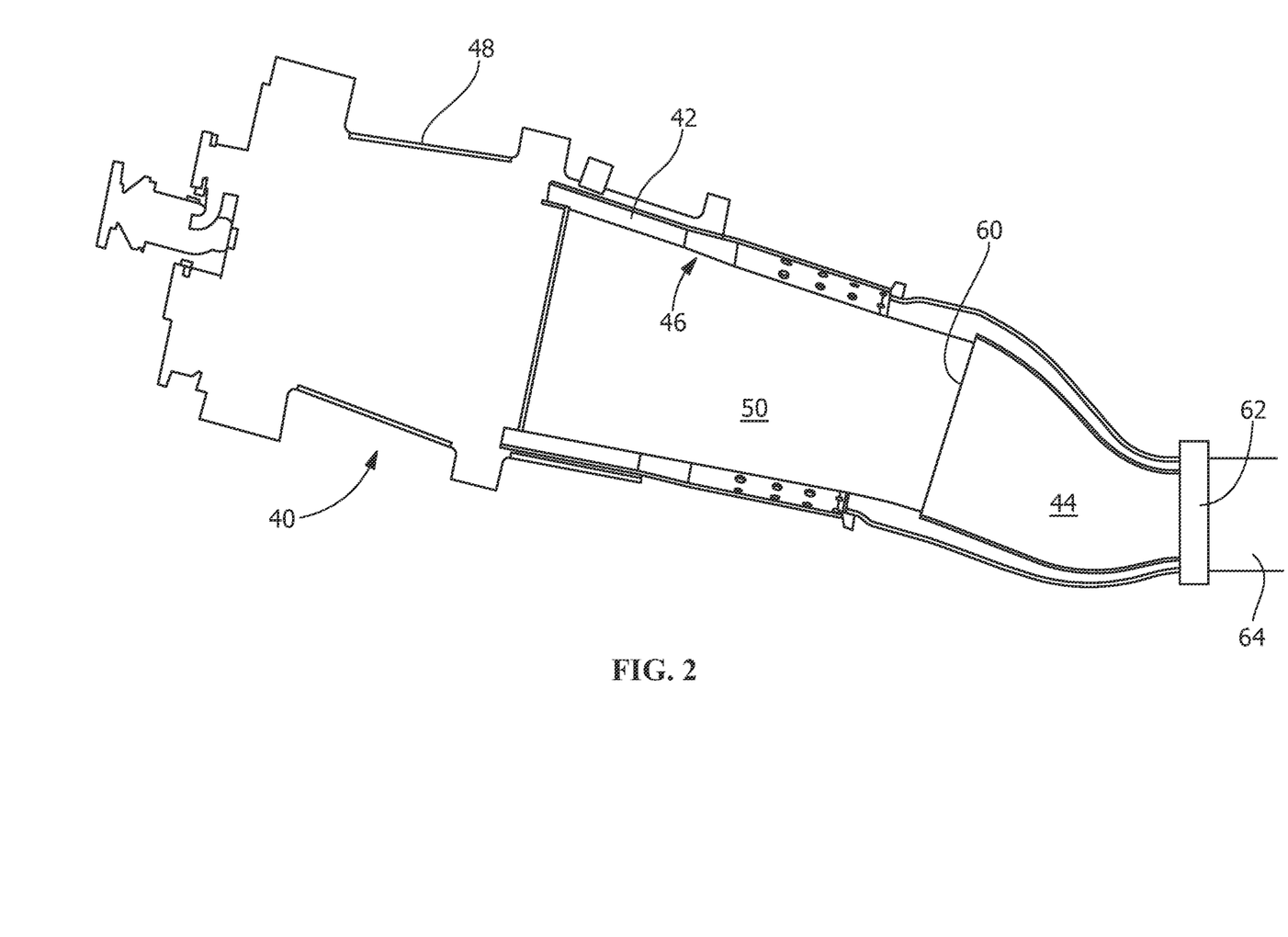
FIG. 2 illustrates a schematic cross-sectional view of a gas turbine combustion system, including the transition piece of the present disclosure.

As shown in FIG. 2, combustion chamber 40 comprises a compressed air inlet duct, flow sleeve 42, and transition piece 44 or combustion gas exhaust duct to direct combustion air to gas turbine 18 (see FIG. 1). The flow sleeve 42 houses a combustion liner 46 and in turn combustion liner 46 defines a combustion zone 50.

Combustion casing 48 attaches combustion chamber 40 to housing 32 of gas turbine engine 12, as illustrated in FIG. 2. Combustion liner 46 is coaxially mounted within flow sleeve 42. Combustion liner 46 and flow sleeve 42 are both coaxially mounted within the combustion casing 48. Flow sleeve 42 is mounted in combustion casing 48 by any appropriate means, such as, but not limited to, mounting brackets.

Combustion liner 46 comprises an inlet end that is generally aligned with a fuel nozzle. Combustion liner 46 also defines an exhaust end. The exhaust end is coupled to the transition piece 44 defining a flow passage for combustion gases from combustion zone 50 to first stage nozzle 64.

Figure 3:
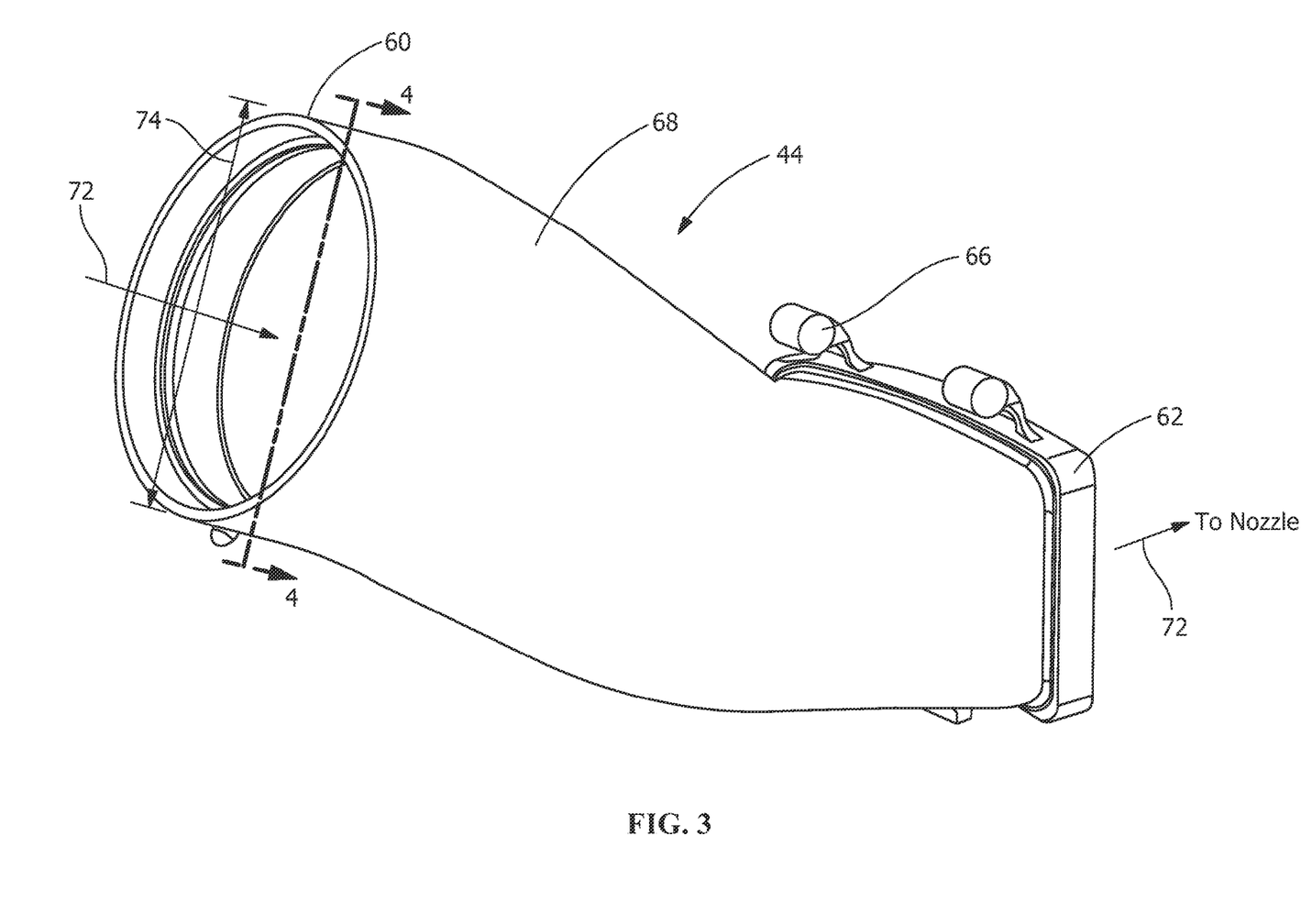
FIG. 3 is a perspective view of a transition piece of the present disclosure.
Figure 4:
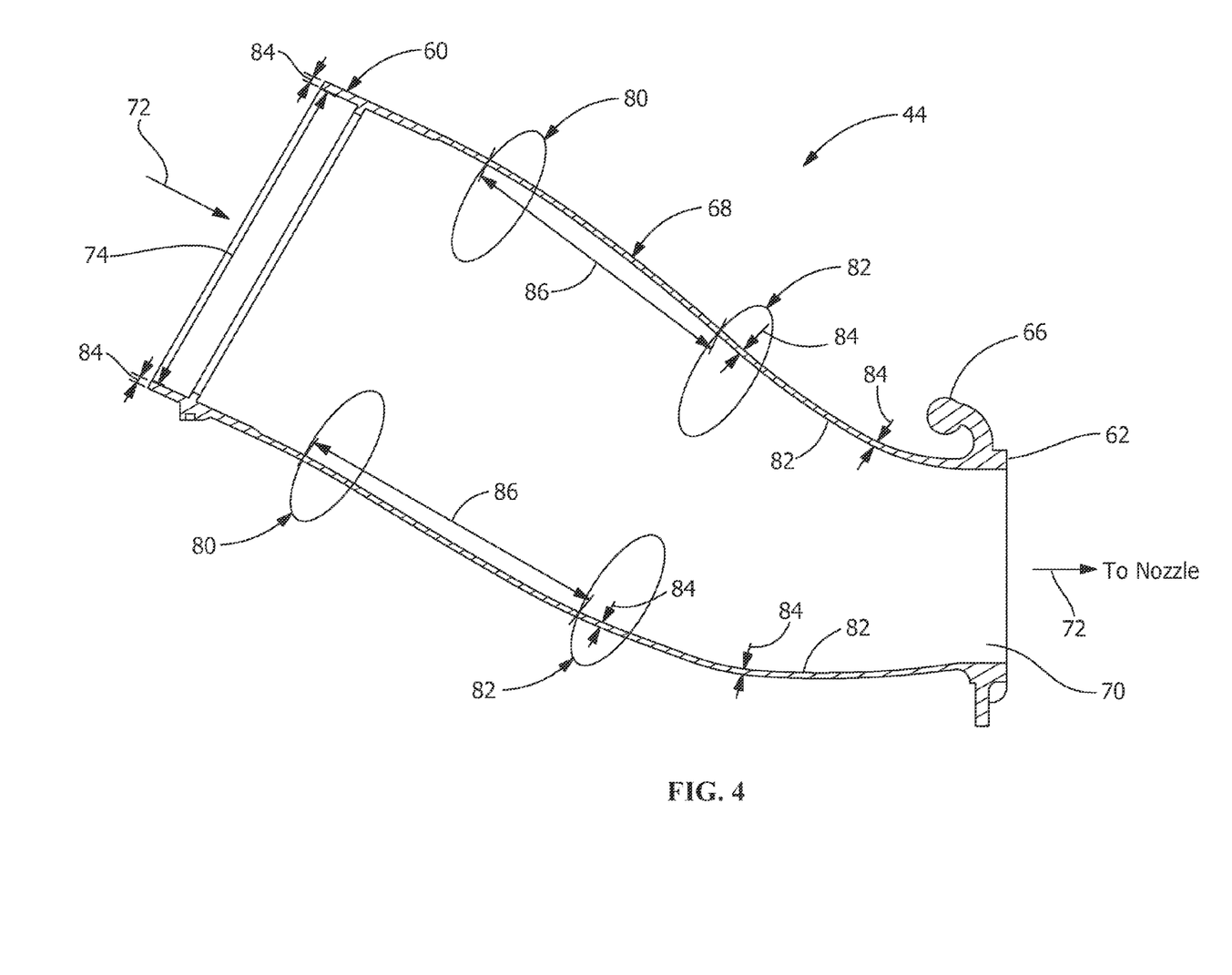
FIG. 4 is a cross section view of the transition piece of FIG. 3 taken along line 4-4 depicting the thick and thin transitions of the present disclosure.
Figure 5:
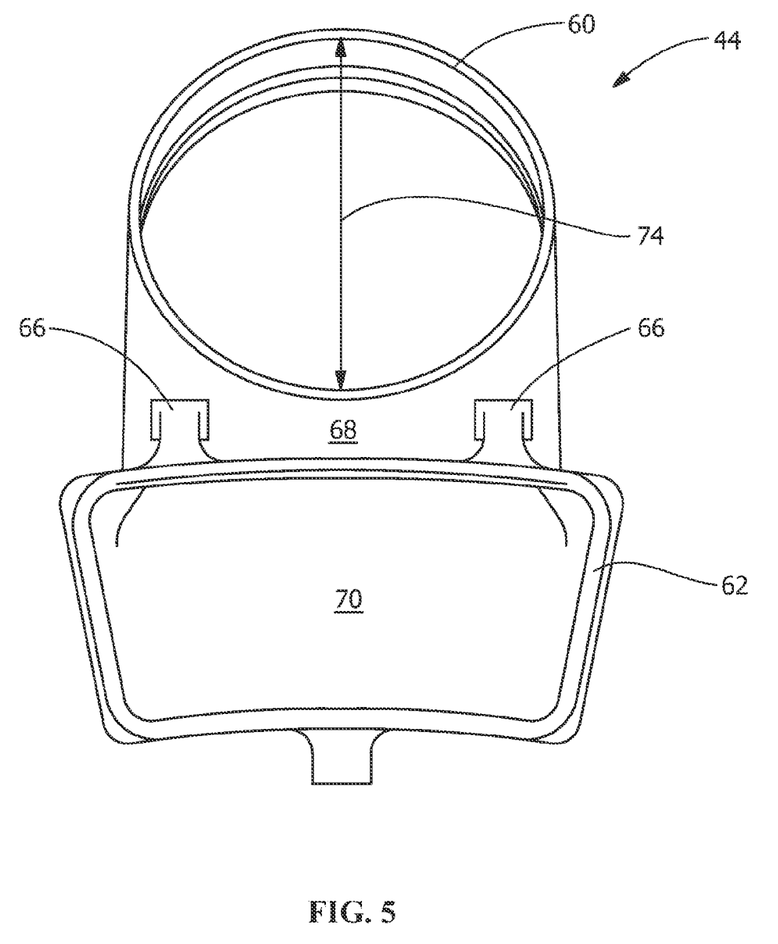
FIG. 5 is a front view of the rectilinear outlet of the transition piece of the present disclosure.

Transition piece 44, depicted in FIGS. 3, 4 and 5, includes body 68 defining flowpath 72 and having generally circular inlet section 60 for receiving combustion products from combustion chamber 40 and generally rectilinear outlet end 62 for flowing the combustor products into first stage nozzle 64. Body 68 defines an enclosure 70 (see FIGS. 4 and 5) between inlet section 60 and outlet end 62 and enclosure 70 confines the flow of combustion products between inlet section 60 and outlet end 62.

Transition piece 44 can be formed via a casting process in a one-piece or unitary construction. The terms "one-piece" or "unitary" construction as utilized herein, include components devoid of mechanical or metallurgical connections within the component, such as, but not limited to, brazing or welding, as evident in known transition piece configurations. In other words, transition piece 44 is not assembled from two or more components or parts, and is formed as a single part. In an alternative embodiment, transition piece 44 includes additional parts or pieces welded to the one-piece structure after transition piece 44 has been formed.

In one embodiment, transition piece 44 is formed from a nickel-based superalloy material, cobalt-based superalloy material, and combinations thereof. The superalloy material should provide sufficient material characteristics for operation at desired gas turbine operating conditions. These material properties include, but are not limited to, enhanced low cycle fatigue (LCF), enhanced resistance and creep strength vs. wrought alloys, enhanced manufacturability, improved machinability, enhanced weldability, and enhanced oxidation resistance. A nickel-based superalloy that provides such material characteristics is UDIMET® alloy 500. UDIMET® is a registered trademark of Special Metals Corporation, New Hartford, N.Y. This alloy is merely exemplary of a material that provides the desired material properties. The composition of UDIMET® alloy 500 is provided in Table 1.

TABLE 1

| Composition of UDIMET ® 500 | |
|---|---|
| Carbon | 0.15 max |
| Aluminum | 2.50-3.25 |
| Titanium | 2.5-3.25 |
| Molybdenum | 3.00-5.00 |
| Chromium | 15.00-20.00 |
| Cobalt | 13.00-20.00 |
| Iron | 4.00 max. |
| Silicon | 0.75 max. |
| Manganese | 0.75 max. |
| Sulphur | 0.015 max. |
| Nickel | Remainder |

The material of transition piece 44 provides desirable LCF resistance and creep strength of the material forming transition piece 44. The LCF resistance and creep strength are provided to extend life intervals of the material, where the life can be enhanced or extended by any amount of time. The nickel-based superalloy possesses strength characteristics at least conforming with, if not greater than, that of UDIMET® alloy 500.

As shown in FIG. 4, a one-piece or unitary transition piece 44 includes thick transitions 80 and thin transitions 82. Thick transitions 80 occur at areas where there is a change in direction of mold to cast transition piece 44 to provide desired taper. Transition piece 44 includes a wall thickness 84 that changes along length of wall. Wall thickness 84 of thin transitions 82 is approximately 2.54 millimeters (0.100 inches) to approximately 5.08 millimeters (0.250 inches) or alternatively 2.75 millimeters (0.108 inches) to approximately 4.75 millimeters (0.187 inches) or alternatively approximately 3.0 millimeters (0.118 inches) to approximately 4.0 millimeters (0.157 inches). Wall thickness 84 of thick transitions 80 is greater than thin transitions 82 and generally approximately 1.1 to approximately 2.5 times greater than wall thickness 84 of thin transitions 82.

Additionally, as shown in FIG. 4, the distance or length between thick transition 80 and thin transition 82 is shown by the line labeled 86. The diameter of transition piece 44 is shown by the line labeled 74. One-piece cast transition piece 44 is formed using a taper ratio. Taper ratio is calculated as function of thick-to-thin transition ratio over a length-to-diameter ratio of transition piece 44. Thick-to-thin transition ratio is a ratio of wall thickness 84 of thick transition 80 over wall thickness 84 of thin transition 82. The thick-to-thin transition ratio is approximately 1.1 to approximately 2.5 or alternatively approximately 1.3 to approximately 2.2 or alternatively approximately 1.4 to approximately 2.0. The length-to-diameter ratio uses the distance or length 86 between thick transition 80 and thin transition 82 over the diameter 74 of transition piece 44. Length-to-diameter ratio is approximately 0.1 to approximately 0.9 or alternatively approximately 0.3 to approximately 0.8 or alternatively approximately 0.5 to approximately 0.7. The one-piece cast transition piece 44 having a taper ratio of about 1.1 to about 2.5 over 0.1 to 0.9 is provided by temperature controlled casting processes.

Additionally, transition piece 44 includes gas turbine component hardware or pieces that were previously welded or otherwise connected to transition piece 44, as shown in FIGS. 2 and 3. These component hardware or pieces can be cast integrally with transition piece 44. Thus, component hardware comprises multiple cast pieces integrally formed with the transition piece 44, without need for such component hardware being joined, to turbine combustor components by mechanical or metallurgical connections within the component, such as but not limited to, brazing or welding. Accordingly, transition piece 44 is free from locations between the transition piece 44 and the component hardware/pieces where the material properties differ from remainder of transition piece 44. Transition piece 44 is formed as a unitary article with integrally cast and connected hardware pieces, where these connected hardware pieces have similar material properties as transition piece 44 as well as similar material properties at points where the connected cast pieces are attached to transition piece 44.

The component hardware/pieces of the transition piece 44 may comprise dilution holes in the generally tubular body 68, mounting connectors 66, circular inlet section 60, and rectilinear outlet end 62. These component hardware/pieces are cast with the transition piece 44 and are cast in a form that is very close to the desired final shape. These other components are known as "near net shape components" require very little or no subsequent machining, after initial casting. Accordingly, by forming these other components to near net or final shape, little after casting processing is needed. Therefore, resulting in enhanced production of a transition piece 44.

The material for the transition piece 44 provides enhanced LCF, enhanced resistance and creep strength, improved manufacturability, better machinability, enhanced weldability, and desirable oxidation resistance. Other cast nickel based gamma prime strengthened alloys are also viable candidates generally having strength characteristics that match or exceed those of UDIMET® alloy 500. "Strength characteristics" herein includes at least LCF resistance, creep strength, yield strength and ultimate tensile strength, each of which can be determined using well-known tests.

Figure 6:
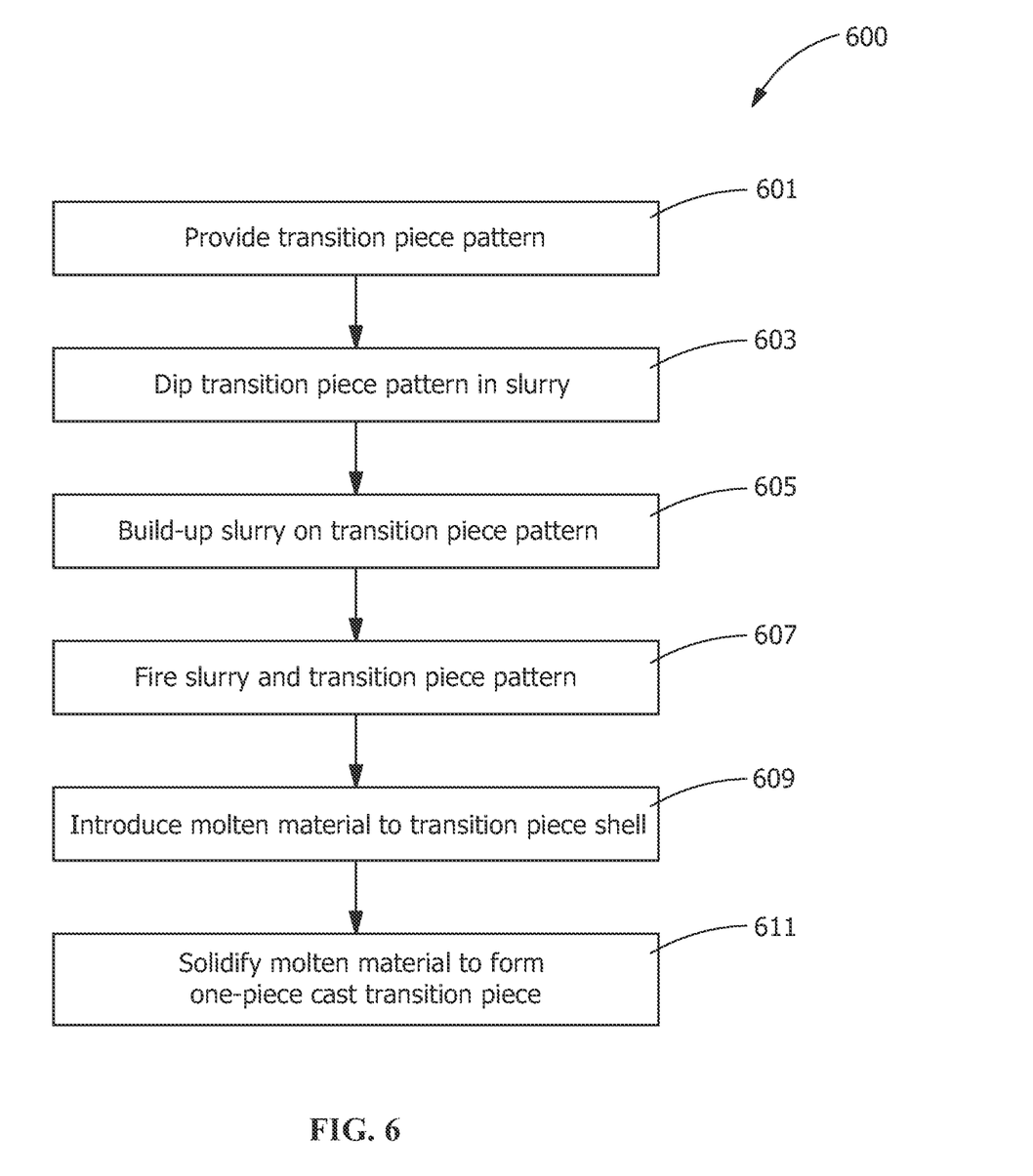
FIG. 6 is a flow chart of the method of forming a one-piece cast transition piece.

As shown in FIG. 6, the method 600 of forming a one-piece cast transition piece 44 may include, in one embodiment, providing a transition piece pattern, step 601 (see FIG. 3). Method 600 includes dipping the transition piece pattern in a slurry material, step 603 to build up the slurry material, step 605. Method 600 includes firing the slurry material to arrive at a transition piece shell, step 607. Method 600 includes filling the transition piece shell with a molten metal, step 609. Method 600 includes solidifying the molten metal to form one-piece cast transition piece 44, step 611 (see FIG. 3). Method 600 includes removing the transition piece shell revealing the formed one-piece cast transition. In one embodiment, a temperature controlled casting process is used. One such temperature controlled casting process is "Thermally Controlled Solidification" (TCS), which is available from Precision Castparts Corporation (PCC) of Portland, Oreg.

In one embodiment, the transition piece pattern comprises a wax, a foam, combinations thereof, or other suitable material that can be used to arrive at the desired transition piece shape. In one embodiment, the slurry material used to form the transition piece shell is a ceramic or other suitable material. In one embodiment, the molten material is a nickel-based superalloy, for example, but not limited to, UDIMET® alloy 500. In another embodiment, transition piece 44 includes a taper ratio of thick-to-thin transitions ratio over length-to-diameter ratio of about 1.1 to about 2.5 over about 0.1 to about 0.9.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A transition piece for a gas turbine, the transition piece comprising:
    a body defining a flowpath and enclosure, the body having a rounded inlet section for receiving combustion products from a combustor and an outlet end for flowing the combustor products into a first stage nozzle of the gas turbine;
    wherein the transition piece comprises a one-piece cast construction of the rounded inlet section, the body and the outlet end, the transition piece being formed from a nickel-based superalloy;
    wherein the transition piece has a thick-to-thin transition ratio of about 1.1 to about 2.5, the thick-to-thin transition ratio defined by a wall thickness of a thick wall section over a wall thickness of a thin wall section; and
    wherein the transition piece has a length-to-diameter ratio of about 0.1 to about 0.9, the length-to-diameter ratio defined by a length between the thick wall section and the thin wall section over a diameter of the rounded inlet section.

2. The transition piece of claim 1, wherein the transition piece comprises a frame surrounding the outlet end, the frame being integrally cast with the transition piece during one-piece cast construction.

3. The transition piece of claim 1, wherein the transition piece comprises component hardware of the gas turbine, the component hardware comprising component hardware that is integrally cast with the transition piece.

4. The transition piece according to claim 3, wherein the component hardware comprises at least one mounting connector.

5. The transition piece of claim 1, wherein the thick-to-thin transition ratio further ranges from about 1.3 to about 2.2.

6. A method of forming a one-piece cast transition piece comprising:
providing a transition piece pattern;
dipping the transition piece pattern in a slurry material to build up the slurry material;
firing the slurry material to produce a transition piece shell;
introducing a molten material including molten metal to the transition piece shell;
solidifying the molten material to form the one-piece cast transition piece having a rounded inlet section;
wherein the transition piece has a thick-to-thin transition ratio of about 1.1 to about 2.5, the thick-to-thin transition ratio defined by a wall thickness of a thick wall section over a wall thickness of a thin wall section; and
wherein the transition piece has a length-to-diameter ratio of about 0.1 to about 0.9, the length-to-diameter ratio defined by a length between the thick wall section and the thin wall section over a diameter of the rounded inlet section.

7. The method of claim 6, wherein the transition piece pattern comprises a wax, a foam, and combinations thereof.

8. The method of claim 6, wherein the slurry material is a ceramic.

9. The method of claim 6, wherein the molten metal comprises a nickel-based superalloy, cobalt-based superalloy, and combinations thereof.

10. The method of claim 6, wherein the transition piece has a length-to-diameter ratio of about 0.3 to about 0.8.

11. The method of claim 6, wherein the transition piece has a taper ratio defined by the thick-to-thin transition ratio of about 1.3 to about 2.2 over the length-to-diameter ratio of about 0.1 to about 0.9.

12. A combustion system comprising:
a combustor;
a transition piece comprising:
a body defining a flowpath and enclosure, the body having a rounded inlet section for receiving combustion products from the combustor and an outlet end for flowing the combustor products into a first stage nozzle of a gas turbine;
wherein the transition piece comprises a one-piece cast construction, the transition piece being formed from a nickel-based superalloy;
wherein the transition piece has a thick-to-thin transition ratio of about 1.1 to about 2.5, the thick-to-thin transition ratio defined by a wall thickness of a thick wall section over a wall thickness of a thin wall section; and
wherein the transition piece has a length-to-diameter ratio of about 0.1 to about 0.9, the length-to-diameter ratio defined by a length between the thick wall section and the thin wall section over a diameter of the rounded inlet section.

13. The combustion system of claim 12, wherein the transition piece comprises a frame surrounding the outlet end and the frame comprising part of the one-piece cast construction.

14. The combustion system of claim 12, wherein the transition piece comprises component hardware of the combustion system, the component hardware comprising component hardware that is integrally cast with the combustion liner.

15. The combustion system of claim 12, wherein the thick-to-thin transition ratio further ranges from about 1.3 to about 2.2.

* * * * *